May 11, 1948.　　　　　D. INGALLS　　　　　2,441,321
FASTENING MEANS
Filed March 14, 1944
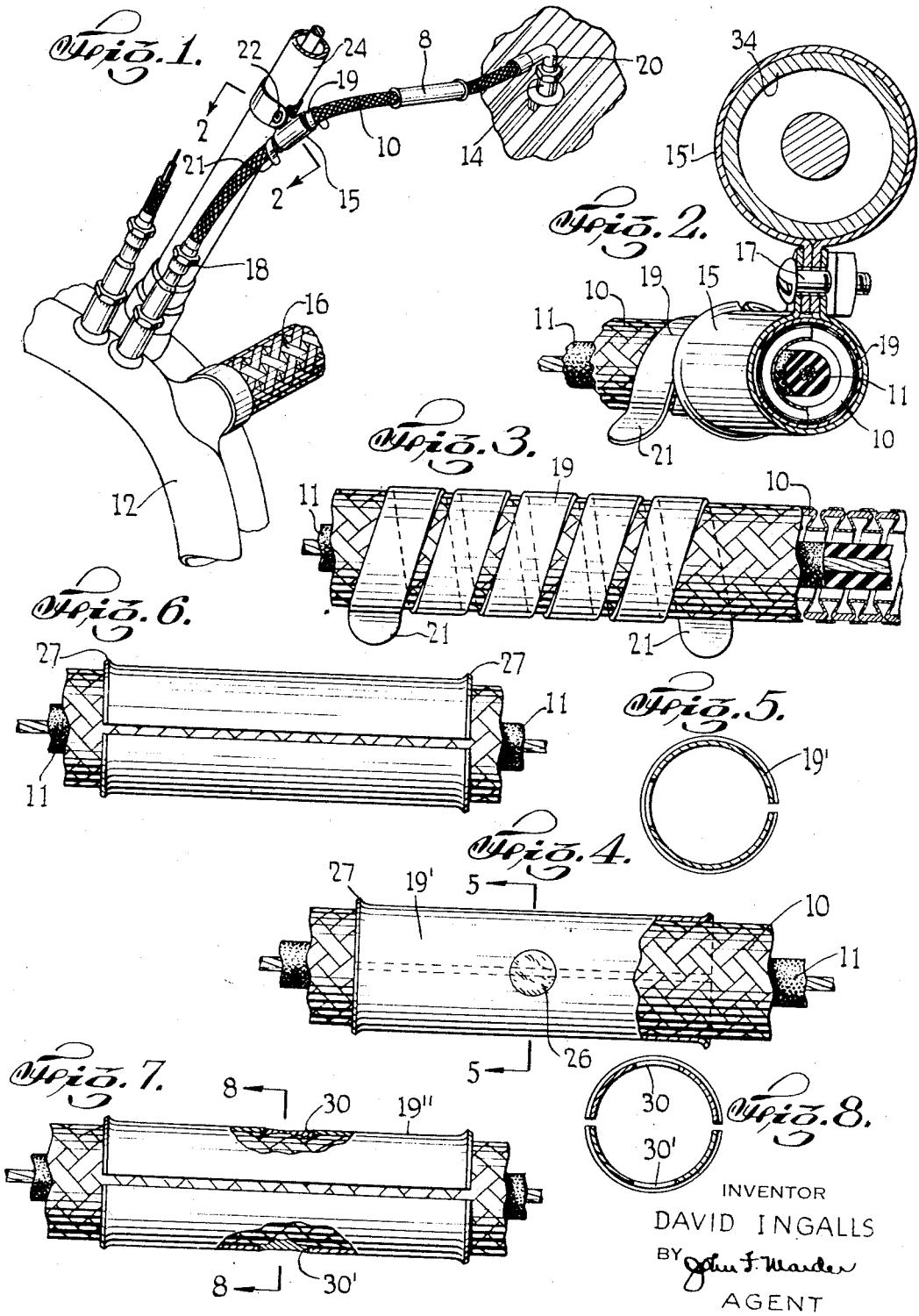
INVENTOR
DAVID INGALLS
BY John F. Marden
AGENT Patented May 11, 1948

2,441,321

UNITED STATES PATENT OFFICE 2,441,321

FASTENING MEANS

David Ingalls, Westfield, N. J., assignor, by mesne assignments, to Titeflex Inc., Newark, N. J., a corporation of Delaware Application March 14, 1944, Serial No. 526,457

3 Claims. (Cl. 174—42)

1

This invention relates to improvements in fastening means such as are used to fasten flexible tubing or conduit to a support.

It is particularly adaptable in connection with fastening of flexible tubing intermediate of locations where tubing or conduit connectors are rigidly affixed to elements of a machine or to other rigid supporting structures. An important application of the invention is in association with aircraft engine ignition devices for fastening flexible metal conduit, such as may be employed to direct and shield an ignition cable, to a suitable engine part located between an ignition manifold and a spark plug in an engine cylinder. In such an application the fastening means serves to suppress vibration of the conduit which normally results from engine vibration and windage and to support the conduit in a uniform configuration with satisfactory bending radii as may be required in good installation practice.

In the usual application, flexible tubing or conduit is subjected to physical stresses varying in degree depending upon the particular conditions of service. Related factors are the size or style of tubing, distance between supports, amplitudes and frequency of vibration or flexing, and other installation variables. On aircraft engine installation where flexible metal conduit is used to shield and protect ignition cables, it is important that these stresses be maintained at a minimum not only to prevent failure of the tubing itself, but also to prevent stresses and resulting strains and failure in the ignition cable.

Various styles of clamping devices have been employed which attach to the flexible tubing and conduit and fasten to an element of the airplane engine such as to a baffle plate or a push rod housing. In service it has been found that the usual clamping devices have the disadvantages of crushing a tubing structure, wearing the wire braid woven over the tubing for the purpose of mechanical protection, loosening by vibration in service, and generally affording an inadequate mechanical application.

It is an object of this invention to provide clamping means for flexible tubing or conduit which may be used without causing damage to the tubing or conduit in service.

A further object is to provide clamping means which remains securely fastened during operating conditions.

A still further object is to provide a clamping device which is readily fabricated with standard machine tools and at low cost, and which may be affixed and adjusted to operating conditions.

2

Other objects of the invention are to provide clamping means for tubing or conduit which may be applied to standard styles and sizes of tubing material and which may also be used in conjunction with the conventional elements of an aircraft engine.

With these and other objects in view which will be apparent throughout the description, the invention resides in the novel construction, combination and arrangement of parts substantially as hereinafter described and more particularly defined by the appended claims, it being understood that such changes in the precise embodiment of the invention may be made as come within the scope of the claims.

The accompanying drawings illustrate examples of physical embodiments of the invention constructed according to the best modes so far devised for the practical application of the principles thereof and in which:

Figure 1 is a perspective view showing a typical installation of the invention in conjunction with partial elements of an aircraft engine;

Figure 2 is a transverse section view taken along the lines 2—2 of Figure 1;

Figure 3 is an elevation showing the application of one species of the sleeve which forms a part of the invention applied to a length of flexible tubing assembled with ignition cable having part of this assembly in section;

Figure 4 is an elevation similar to Figure 3 showing an alternative style of sleeve as that shown in Figure 3;

Figure 5 is a transverse section of a sleeve only taken along the lines 5—5 in Figure 4.

Figure 6 is an elevation view of the detail in Figure 4, with the assembly revolved about 180° about its longitudinal axis;

Figure 7 is an elevation end view showing a third style of sleeve which forms a part of the invention assembled to a length of flexible tubing; and Figure 8 is a transverse section view of the sleeve only shown in Figure 7.

In the drawings, referring to Figure 1, the flexible metal tube 10 is employed to shield and protect an ignition cable leading to spark plug 14 from within the manifold tube 12.

The manifold tube 12 may be rigidly fixed to any convenient part of an internal combustion engine and is used to distribute the group of ignition cables which supply current to the spark plugs. While the balance of the ignition elements are not shown in the drawings, a group of ignition cables may be directed from a magneto, not shown, through the large flexible conduit 16 secured to the ignition manifold 12. Inasmuch as there may be relative movement and also problems of installation between the manifold 12 and the spark plug 14, it becomes expedient to use a flexible metal tubing or conduit to shield and protect the ignition cable between these points rather than a rigid conduit. Suitable fastening means 18 and 20 are employed to connect the flexible metal tube or conduit with the rigidly mounted manifold and spark plug respectively.

It will be noted here that there is a substantial length of flexible line leading from the manifold 12 to the plug 14 and that at an intermediate point of fastening 22 is employed utilizing the tube 24 or other suitable elements of the engine. In this case the tube is shown as a push rod housing. Sleeve 8 is fitted over the flexible conduit to absorb abrasion without wearing the braid on the flexible tube as the tube passes the engine baffles, not shown.

Referring now to Figure 2, the flexible conduit 10 housing the ignition cable 11 is attached to push rod housing 24 by means of devices about to be described. Two metal bands or clips, 15 and 15' are wrapped about the flexible metal tubing 10 and push rod housing 24 respectively, and are interconnected by means of the clamping nut and screw 17 fitted through suitable holes in radially formed ears at the ends of the clamps. Disposed between the sheet metal clamp 15 and the flexible tubing 10 is a sleeve 19 formed of a helically wound flat strip of spring steel fitting snugly over the tubing or conduit so that it does not slide. This sleeve is shown in detail in Figure 3. The out-turned and rounded ends 21 on the sleeve serve to retain the clip 15 from sliding beyond the sleeve in the event that the clamping devices should become loose in service. Each turn of the flat metal strip is spaced axially from the adjacent convolution so that bending of the sleeve in a limited degree is possible without interference. This permits a certain amount of flexibility without a tendency of the edge of the sleeve to cut into the braid 23 woven in basket weave style about the flexible metal tube core. Furthermore, the spring style sleeve permits a graduated bending of the flexible tube at the point of rigid support which allows for more uniform curvature of the tubing or conduit in installation and enhances its life during flexing or vibration.

Referring now to Figure 4, the second style of sleeve 19' may be employed comprising a bell-mouthed tubular section which is soldered or otherwise fixed in place over the flexible tube as by soldering at the hole 26. This sleeve 19' shown in Figure 6 from the opposite side as that shown in Figure 4 has a full length slot cut to permit installation on flexible tubing varying slightly in size, and also to provide a certain amount of spring action which tends to retain the sleeve from sliding on the tubing during assemblying operations before soldering. A section of this tubular sleeve is shown in Figure 5.

The bell-mouthed ends 27 in the tubular sleeve permit flexing of the tube without extreme chafing of the braid over the tube and also permits installation of the tubing over an irregular surface. Both species of sleeve 19 and 19' shown in Figures 3, 4 and 6 apply to the flexible tubing 10 before attachment of fittings such as those shown generally at 18 and 20 in Figure 1.

A third style sleeve 19" is shown in Figure 7. This type sleeve comprises two hollow substantially semi-cylindrical sections each of which may have solder holes 30 and 30' midway between their ends for fastening to the tubing. As the figure shows, solder applied at these solder holes adheres to the braid and tubing and also goes irregularly between the braid wires to effect an anchoring action.

Any of the three styles of sleeve, and in association with suitable clips, may be applied at a predetermined location on the metal tubing or the conduit for given conditions of installation. Encircling clips of the style of 15 may then be applied over the sleeve after which the assembly may be clamped either to a second clip as shown on 15' or to any other relatively stationary support. A smooth rigid cylindrical surface is then afforded, preferably approximately double the length of the clip to permit alignment with the part to which the clip is fastened.

It is understood that the form of my invention, herewith shown and described, is to be taken as a preferred example of the same, and that various changes in the shape, size, and arrangement of parts may be resorted to without departing from the spirit of my invention, or the scope of the subjoined claims.

Having thus described the invention, what is claimed as new and desired to be secured by Letters Patent is:

1. In combination with a flexible tubing comprising a corrugated metal conduit through which electrical conductors may be directed, a braid covering over said conduit, fittings permanently fastened on the opposite ends of the tubing for attaching the tubing to end supports, a metal sleeve over a portion of the braided covering between said fittings, a permanently bonded connection between said sleeve and said braid covering for preventing endwise movement of the sleeve and the braid covering, said sleeve being capable of resisting normal clamping stress without crushing the corrugations of the flexible metal conduit.

2. An ignition cable enclosure including a flexible tubing comprising a corrupated metal conduit through which an electrical conductor may be directed, a braid covering over said conduit, and fittings at opposite ends of the tubing for connecting the tubing with end supports, a metal sleeve over a portion of the braided covering between the ends of the tubing, a permanently bonded connection between a portion of the sleeve and the braided covering for preventing endwise displacement of the sleeve on the braided covering, said sleeve having a split extending lengthwise thereof to allow circumferential movement of at least a part of the sleeve relative to the braided covering, said sleeve being capable of resisting radial clamping pressure that would crush the corrugations of the conduit.

3. An enclosure for shielding an ignition cable, said enclosure comprising flexible tubing of substantially circular cross-section and including an inner corrugated metal conduit and an outer braid covering over the corrugations of the inner conduit, a fitting permanently fastened on each end of the tubing, each of the fittings being of larger diameter than the outside of said tubing, a sleeve surrounding a portion of the length of the tubing at a region intermediate the ends of the tubing, said sleeve fitting snugly over the braid and being of metal and having a slot that extends from one end of the sleeve to the other to allow for installation of the sleeve on flexible tubing varying slightly in size and also to provide a certain amount of spring action which tends to retain the sleeve from sliding on the tubing, said sleeve being capable of resisting radial clamping pressure that would crush the flexible tubing, and out-turned ends at opposite ends of the sleeve for preventing the sleeve from sliding out of a clamp endwise, if a clamp in which the sleeve is held becomes loose.

DAVID INGALLS.

REFERENCES CITED

The following references are of record in the file of this patent:

UNITED STATES PATENTS

| Number | Name | Date |
| --- | --- | --- |
| 966,311 | Clark | Aug. 2, 1910 |
| 1,617,373 | Childs | Feb. 15, 1927 |
| 1,739,293 | Deems | Dec. 10, 1929 |
| 1,871,336 | Miller | Aug. 9, 1932 |
| 2,032,753 | James | Mar. 3, 1936 |
| 2,105,791 | Mascuch | Jan. 18, 1938 |
| 2,136,850 | Honey | Nov. 15, 1938 |
| 2,275,019 | Peterson | Mar. 3, 1942 |
| 2,316,504 | Dayton | Apr. 13, 1943 |

FOREIGN PATENTS

| Number | Country | Date |
| --- | --- | --- |
| 364,789 | Great Britain | Jan. 14, 1932 |
| 386,751 | Germany | Dec. 22, 1923 |
| 416,011 | Great Britain | Sept. 4, 1934 |
| 484,505 | Great Britain | May 6, 1938 |